(12) United States Patent
Devendorf (10) Patent No.: US 11,506,067 B2
(45) Date of Patent: Nov. 22, 2022

(54) GAS TURBINE ENGINE WITH CLUTCH ASSEMBLY

(71) Applicant: General Electric Company, Schenectady, NY (US)

(72) Inventor: Brian Lewis Devendorf, Georgetown, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/904,035

(22) Filed: Jun. 17, 2020

(65) Prior Publication Data
US 2021/0222628 A1 Jul. 22, 2021

Related U.S. Application Data

(60) Provisional application No. 62/915,364, filed on Oct. 15, 2019.

(51) Int. Cl.
*F01D 7/00* (2006.01)
*F02C 7/36* (2006.01)
(Continued)

(52) U.S. Cl.
CPC ............... *F01D 7/00* (2013.01); *B32B 7/022* (2019.01); *B64C 1/12* (2013.01); *B64C 1/38* (2013.01); *B64D 7/00* (2013.01); *B64D 27/12* (2013.01); *B64D 45/00* (2013.01); *F01D 5/146* (2013.01); *F01D 5/187* (2013.01); *F01D 5/30* (2013.01); *F01D 5/3007* (2013.01); *F01D 9/041* (2013.01); *F01D 15/10* (2013.01); *F01D 15/12* (2013.01); *F01D 17/162* (2013.01); *F01D 25/12* (2013.01); *F02C 6/206* (2013.01); *F02C 7/264* (2013.01);
(Continued)

(58) Field of Classification Search
CPC .... F02C 7/32; F02C 7/36; F02C 7/262; F02C 7/268; F02C 7/275; F02C 3/107; F02C 3/313; F02C 6/206; F01D 15/10; F05D 2260/4023; F05D 2260/4031; F05D 2240/24; F05D 2240/60; F05D 2270/304; F05D 2220/76; F05D 2220/323
See application file for complete search history.

(56) References Cited

U.S. PATENT DOCUMENTS 4,534,526 A 8/1985 Metzger et al.
4,917,336 A 4/1990 Jacobs et al.
(Continued)

OTHER PUBLICATIONS

Carney et al., Weight Assessment for Fuselage Shielding on Aircraft With Open-Rotor Engines and Composite Blade Loss, NASA/TM-2013-216582, 2013, 33 Pages.
(Continued)

*Primary Examiner* — Todd E Manahan
*Assistant Examiner* — David P. Olynick
(74) *Attorney, Agent, or Firm* — Dority & Manning, P.A.

(57) ABSTRACT

A gas turbine engine is provided. The gas turbine engine includes a turbomachine having a low speed spool and a high speed spool; a rotor assembly coupled to the low speed spool; an electric machine rotatable with the low speed spool for extracting power from the low speed spool, for adding power to the low speed spool, or both; and an inter-spool clutch positioned between the low speed spool and the high speed spool for selectively coupling the low speed spool to the high speed spool.

17 Claims, 5 Drawing Sheets

(51) Int. Cl.

| | | |
|---|---|---|
| F02C 7/32 | (2006.01) | |
| F01D 15/12 | (2006.01) | |
| F01D 15/10 | (2006.01) | |
| F02C 9/00 | (2006.01) | |
| F02C 9/22 | (2006.01) | |
| F02K 1/76 | (2006.01) | |
| F01D 5/18 | (2006.01) | |
| F01D 5/30 | (2006.01) | |
| F02C 7/264 | (2006.01) | |
| F01D 9/04 | (2006.01) | |
| F01D 17/16 | (2006.01) | |
| B64D 27/12 | (2006.01) | |
| F01D 25/12 | (2006.01) | |
| B32B 7/022 | (2019.01) | |
| B64C 1/12 | (2006.01) | |
| B64D 7/00 | (2006.01) | |
| B64C 1/38 | (2006.01) | |
| F01D 5/14 | (2006.01) | |
| F02K 1/66 | (2006.01) | |
| F02C 9/48 | (2006.01) | |
| F02C 9/20 | (2006.01) | |
| B64D 45/00 | (2006.01) | |
| F02C 6/20 | (2006.01) | |
| B64C 1/00 | (2006.01) | |
| F02C 3/113 | (2006.01) | |

(52) U.S. Cl.
CPC .................. *F02C 7/32* (2013.01); *F02C 7/36* (2013.01); *F02C 9/00* (2013.01); *F02C 9/20* (2013.01); *F02C 9/22* (2013.01); *F02C 9/48* (2013.01); *F02K 1/66* (2013.01); *F02K 1/76* (2013.01); *B32B 2307/558* (2013.01); *B32B 2307/72* (2013.01); *B32B 2307/732* (2013.01); *B32B 2571/02* (2013.01); *B32B 2605/18* (2013.01); *B64C 2001/0072* (2013.01); *F02C 3/113* (2013.01); *F05D 2220/323* (2013.01); *F05D 2220/325* (2013.01); *F05D 2230/60* (2013.01); *F05D 2240/12* (2013.01); *F05D 2240/24* (2013.01); *F05D 2240/60* (2013.01); *F05D 2250/37* (2013.01); *F05D 2260/201* (2013.01); *F05D 2260/30* (2013.01); *F05D 2260/4031* (2013.01); *F05D 2260/70* (2013.01); *F05D 2270/05* (2013.01); *F05D 2270/051* (2013.01); *F05D 2270/121* (2013.01); *F05D 2270/304* (2013.01); *F05D 2270/71* (2013.01); *F05D 2270/81* (2013.01)

(56) References Cited

U.S. PATENT DOCUMENTS

| | | |
|---|---|---|
| 4,934,825 A | 6/1990 | Martin |
| 4,976,102 A | 12/1990 | Taylor |
| 5,148,402 A | 9/1992 | Magliozzi et al. |
| 5,156,353 A | 10/1992 | Gliebe et al. |
| 5,190,441 A | 3/1993 | Murphy et al. |
| 5,197,855 A | 3/1993 | Magliozzi et al. |
| 5,349,814 A * | 9/1994 | Ciokajlo .............. F02C 7/262 60/226.1 |
| 5,789,678 A | 8/1998 | Pla |
| 6,341,747 B1 | 1/2002 | Schmidt et al. |
| 7,578,132 B2 | 8/2009 | Webster |
| 8,011,613 B2 | 9/2011 | Belleville |
| 8,083,482 B2 | 12/2011 | Serven et al. |
| 8,087,607 B2 | 1/2012 | Moore et al. |
| 8,186,617 B2 | 5/2012 | Llamas Sandin |
| 8,196,860 B2 | 6/2012 | Gall et al. |
| 8,210,798 B2 | 7/2012 | Stern |
| 8,220,586 B2 | 7/2012 | Todorovic |
| 8,240,609 B2 | 8/2012 | Parazzoli et al. |
| 8,350,398 B2 | 1/2013 | Butt |
| 8,550,397 B2 | 10/2013 | Verde Preckler et al. |
| 8,690,106 B1 | 4/2014 | Reissig |
| 8,967,967 B2 | 3/2015 | Stretton et al. |
| 9,057,329 B2 | 6/2015 | Weir et al. |
| 9,102,397 B2 | 8/2015 | Wood |
| 9,527,578 B2 | 12/2016 | Towkan |
| 9,540,094 B2 | 1/2017 | Negulescu et al. |
| 9,725,155 B2 | 8/2017 | Miller et al. |
| 9,745,051 B2 | 8/2017 | Tantot et al. |
| 9,758,254 B2 | 9/2017 | Moore et al. |
| 9,856,745 B2 | 1/2018 | Ali |
| 9,890,657 B2 | 2/2018 | Ali |
| 10,118,710 B2 | 11/2018 | Derrez et al. |
| 10,131,441 B2 | 11/2018 | Edwards et al. |
| 10,202,865 B2 | 2/2019 | Breeze-Stringfellow et al. |
| 10,370,086 B2 | 8/2019 | Vion et al. |
| 10,378,452 B1 | 8/2019 | Barmichev et al. |
| 10,399,664 B2 | 9/2019 | Bowden et al. |
| 10,414,486 B2 | 9/2019 | Wood et al. |
| 2008/0245925 A1 | 10/2008 | Udall |
| 2012/0195739 A1 | 8/2012 | Kingan |
| 2013/0000317 A1 * | 1/2013 | Berryann ............... F02C 3/113 60/778 |
| 2013/0115083 A1 | 5/2013 | Vuillemin |
| 2014/0248116 A1 | 9/2014 | Ali |
| 2015/0291276 A1 | 10/2015 | Zatorski et al. |
| 2015/0330300 A1 * | 11/2015 | Suciu .................. F02K 3/06 416/169 R |
| 2015/0344127 A1 | 12/2015 | Wood et al. |
| 2016/0010487 A1 | 1/2016 | Breeze-Stringfellow et al. |
| 2016/0333729 A1 | 11/2016 | Miller et al. |
| 2016/0333734 A1 | 11/2016 | Bowden et al. |
| 2016/0368592 A1 | 12/2016 | Szymandera |
| 2017/0002688 A1 | 1/2017 | Beutin et al. |
| 2017/0159571 A1 | 6/2017 | Sidelkovskiy |
| 2017/0225773 A1 | 8/2017 | Wood et al. |
| 2018/0065727 A1 | 3/2018 | Gruber et al. |
| 2018/0079492 A1 | 3/2018 | Seidel et al. |
| 2018/0127084 A1 | 5/2018 | Tajan et al. |
| 2018/0354634 A1 | 12/2018 | Jodet et al. |
| 2020/0263614 A1 * | 8/2020 | Oyama .................. F16D 41/12 |
| 2020/0284201 A1 * | 9/2020 | Gebhard ................. F02C 3/10 |

OTHER PUBLICATIONS

Gazzaniga et al., Wind Tunnel Performance Results of Swirl Recovery Vanes as Tested with an Advanced High-Speed Propeller, AIAA-92-3770, 28th Joint Propulsion Conference Exhibit, Nashville TN, Jul. 6-8, 1992, 42 Pages.

Open Rotor Engine and Installation, European Aviation Safety Agency, Notice of Proposed Amendment 2015-22, RMT.0384 (MDM. 092) Dec. 21, 2015., 96 Pages.

* cited by examiner

GAS TURBINE ENGINE WITH CLUTCH ASSEMBLY

CROSS-REFERENCE TO RELATED APPLICATIONS

This application is a non-provisional application claiming the benefit of priority under 35 U.S.C. § 119(e) to U.S. Provisional Application No. 62/915,364, filed Oct. 15, 2019, which is hereby incorporated by reference in its entirety.

FIELD

This application is generally directed to a gas turbine engine configured to start using an electric machine coupled to a low speed spool.

BACKGROUND

A gas turbine engine generally includes a turbomachine and a rotor assembly. In the case of a turbofan engine, the rotor assembly may be configured as a fan assembly. The turbomachine generally includes a high speed spool and a low speed spool. A combustion section receives pressurized air, which is mixed with fuel and combusted within a combustion chamber to generate combustion gases. The combustion gases are provided first to a high speed turbine of the high speed spool, driving the high speed spool, and subsequently to a low speed turbine of the low speed spool, driving the low speed spool. The rotor assembly is typically coupled to the low speed spool.

Certain gas turbine engines further include an accessory gearbox for powering various accessory systems of the gas turbine engine. The accessory gearbox is coupled to the high speed spool. As will be appreciated, however, extracting power from the high speed spool may result in the high speed spool being less responsive to engine commands, which in turn may result in the low speed spool and rotor assembly being less responsive to engine commands.

The inventors of the present disclosure have found that it may be useful to couple the accessory gearbox to the low speed spool to increase a responsiveness of the high speed spool. However, the inventors of the present disclosure have also found that such a configuration may make it difficult to start the engine using an electric motor coupled to the accessory gearbox, as the electric motor in such a configuration does not have a mechanical connection to the high speed spool.

Accordingly, a gas turbine engine having one or more features for increasing a responsiveness of the gas turbine engine to engine commands would be useful. More specifically, a gas turbine engine having one or more features for increasing a responsiveness of the gas turbine engine to engine commands while still facilitating a start of the gas turbine engine with an electric motor coupled to the accessory gearbox would be useful.

BRIEF DESCRIPTION

Aspects and advantages of the invention will be set forth in part in the following description, or may be obvious from the description, or may be learned through practice of the invention.

In an aspect of the present disclosure, a gas turbine engine is provided. The gas turbine engine includes a turbomachine having a low speed spool and a high speed spool; a rotor assembly coupled to the low speed spool; an electric machine rotatable with the low speed spool for extracting power from the low speed spool, for adding power to the low speed spool, or both; and an inter-spool clutch positioned between the low speed spool and the high speed spool for selectively coupling the low speed spool to the high speed spool.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
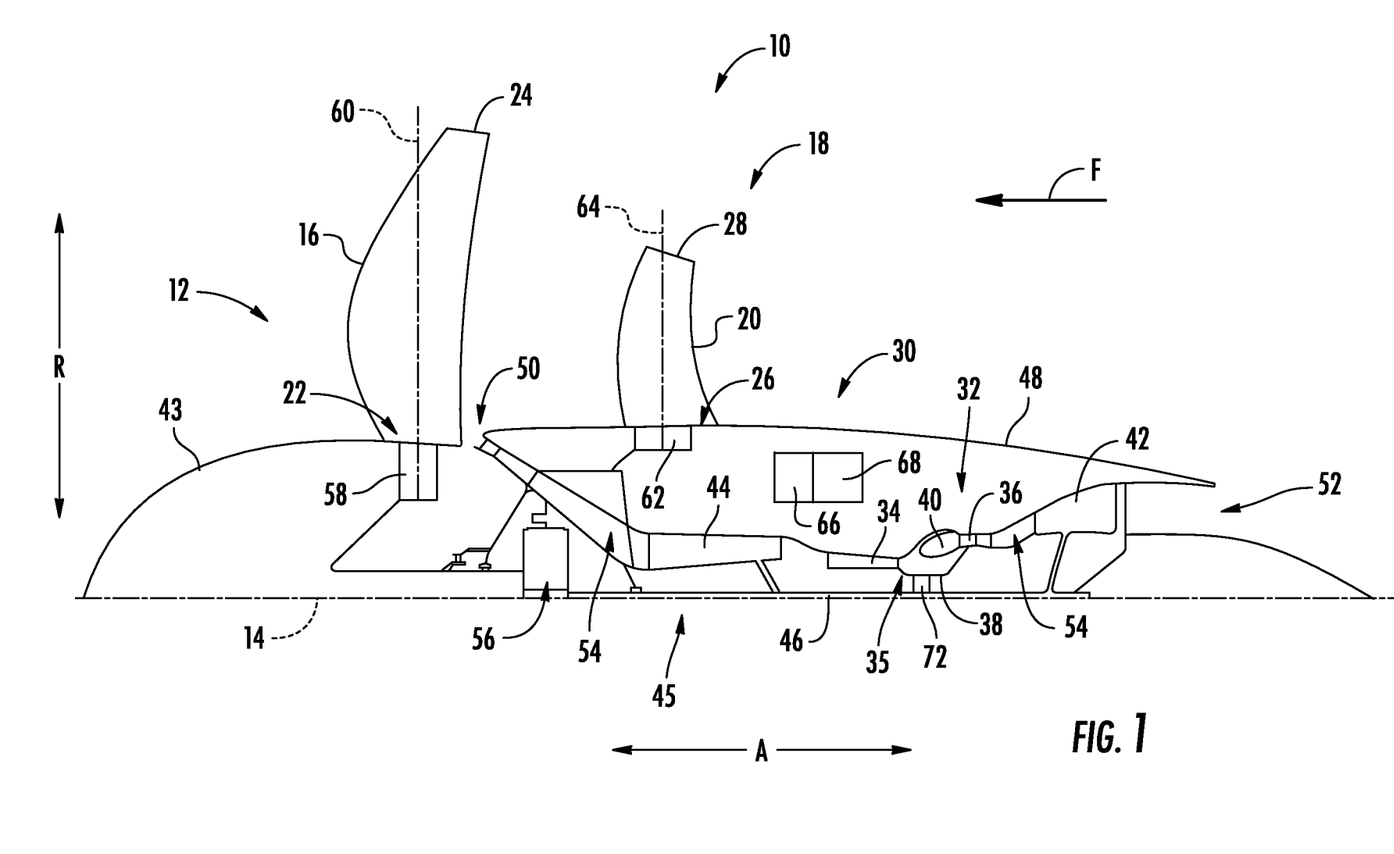
FIG. 1 is a schematic, cross-sectional view of a gas turbine engine in accordance with an exemplary aspect of the present disclosure.

Referring now to the Drawings, FIG. 1 shows an elevational cross-sectional view of an exemplary embodiment of a gas turbine engine as may incorporate one or more inventive aspects of the present disclosure. In particular, the exemplary gas turbine engine of FIG. 1 is a configured as a single unducted rotor engine 10 defining an axial direction A, a radial direction R, and a circumferential direction C1 (see FIGS. 2 and 3, extending about the axial direction A). As is seen from FIG. 1, engine 10 takes the form of an open rotor propulsion system and has a rotor assembly 12 which includes an array of airfoils arranged around a central longitudinal axis 14 of engine 10, and more particularly includes an array of rotor blades 16 arranged around the central longitudinal axis 14 of engine 10. Moreover, as will be explained in more detail below, the engine 10 additionally includes a non-rotating vane assembly 18 positioned aft of the rotor assembly 12 (i.e., non-rotating with respect to the central axis 14), which includes an array of airfoils also disposed around central axis 14, and more particularly includes an array of vanes 20 disposed around central axis 14. The rotor blades 16 are arranged in typically equally spaced relation around the centerline 14, and each blade has a root 22 and a tip 24 and a span defined therebetween. Similarly, the vanes 20 are also arranged in typically equally spaced relation around the centerline 14, and each has a root 26 and a tip 28 and a span defined therebetween. The rotor assembly 12 further includes a hub 43 located forward of the plurality of rotor blades 16.

Additionally, the engine 10 includes a turbomachine 30 having core (or high speed system) 32 and a low speed system. The core 32 generally includes a high-speed compressor 34, a high speed turbine 36, and a high speed shaft 38 extending therebetween and connecting the high speed compressor 34 and high speed turbine 36. The high speed compressor 34 (or at least the rotating components thereof), the high speed turbine 36 (or at least the rotating components thereof), and the high speed shaft 38 may collectively be referred to as a high speed spool 35 of the engine. Further, a combustion section 40 is located between the high speed compressor 34 and high speed turbine 36. The combustion section 40 may include one or more configurations for receiving a mixture of fuel and air, and providing a flow of combustion gasses through the high speed turbine 36 for driving the high speed spool 35.

The low speed system similarly includes a low speed turbine 42, a low speed compressor or booster 44, and a low speed shaft 46 extending between and connecting the low speed compressor 44 and low speed turbine 42. The low speed compressor 44 (or at least the rotating components thereof), the low speed turbine 42 (or at least the rotating components thereof), and the low speed shaft 46 may collectively be referred to as a low speed spool 45 of the engine.

Although the engine 10 is depicted with the low speed compressor 44 positioned forward of the high speed compressor 34, in certain embodiments the compressors 34, 44 may be in an interdigitated arrangement. Additionally, or alternatively, although the engine 10 is depicted with the high speed turbine 36 positioned forward of the low speed turbine 42, in certain embodiments the turbines 36, 42 may similarly be in an interdigitated arrangement.

Referring still to FIG. 1, the turbomachine 30 is generally encased in a cowl 48. Moreover, it will be appreciated that the cowl 48 defines at least in part an inlet 50 and an exhaust 52, and includes a turbomachinery flowpath 54 extending between the inlet 50 and the exhaust 52. The inlet 50 is for the embodiment shown an annular or axisymmetric 360 degree inlet 50 located between the rotor blade assembly 12 and the fixed or stationary vane assembly 18, and provides a path for incoming atmospheric air to enter the turbomachinery flowpath 54 (and compressors 44, 34, combustion section 40, and turbines 36, 42) inwardly of the guide vanes 28 along the radial direction R. Such a location may be advantageous for a variety of reasons, including management of icing performance as well as protecting the inlet 50 from various objects and materials as may be encountered in operation.

However, in other embodiments, the inlet 50 may be positioned at any other suitable location, e.g., aft of the vane assembly 18, arranged in a non-axisymmetric manner, etc.

As briefly mentioned above the engine 10 includes a vane assembly 18. The vane assembly 18 extends from the cowl 48 and is positioned aft of the rotor assembly 12. The vanes 20 of the vane assembly 18 may be mounted to a stationary frame or other mounting structure and do not rotate relative to the central axis 14. For reference purposes, FIG. 1 also depicts the forward direction with arrow F, which in turn defines the forward and aft portions of the system. As shown in FIG. 1, the rotor assembly 12 is located forward of the turbomachine 30 in a "puller" configuration, and the exhaust 52 is located aft of the guide vanes 28. As will be appreciated, the vanes 20 of the vane assembly 18 may be configured for straightening out an airflow (e.g., reducing a swirl in the airflow) from the rotor assembly 12 to increase an efficiency of the engine 10. For example, the vanes 20 may be sized, shaped, and configured to impart a counteracting swirl to the airflow from the rotor blades 16 so that in a downstream direction aft of both rows of airfoils (e.g., blades 16, vanes 20) the airflow has a greatly reduced degree of swirl, which may translate to an increased level of induced efficiency.

Referring still to FIG. 1, it may be desirable that the rotor blades 16, the vanes 20, or both, incorporate a pitch change mechanism such that the airfoils (e.g., blades 16, vanes 20, etc.) can be rotated with respect to an axis of pitch rotation either independently or in conjunction with one another. Such pitch change can be utilized to vary thrust and/or swirl effects under various operating conditions, including to adjust a magnitude or direction of thrust produced at the rotor blades 16, or to provide a thrust reversing feature which may be useful in certain operating conditions such as upon landing an aircraft, or to desirably adjust acoustic noise produced at least in part by the rotor blades 16, the vanes 20, or aerodynamic interactions from the rotor blades 16 relative to the vanes 20. More specifically, for the embodiment of FIG. 1, the rotor assembly 12 is depicted with a pitch change mechanism 58 for rotating the rotor blades 16 about their respective pitch axes 60, and the vane assembly 18 is depicted with a pitch change mechanism 62 for rotating the vanes 20 about their respective pitch axes 64.

As is depicted, the rotor assembly 12 is driven by the turbomachine 30, and more specifically, is driven by the low speed spool 45. More specifically, the engine 10 in the embodiment shown in FIG. 1 includes a power gearbox 56, and the rotor assembly 12 is driven by the low speed spool 45 of the turbomachine 30 across the power gearbox 56. The power gearbox 56 may include a gearset for decreasing a rotational speed of the low speed spool 45 relative to the low speed turbine 42, such that the rotor assembly 12 may rotate at a slower rotational speed than the low speed spool 45. In such a manner, the rotating rotor blades 16 of the rotor assembly 12 may rotate around the axis 14 and generate thrust to propel engine 10, and hence an aircraft to which it is associated, in a forward direction F.

Referring still to FIG. 1, the exemplary engine 10 includes an accessory gearbox 66 and an electric machine 68, with the turbomachine 30 driving the accessory gearbox 66 and the electric machine 68. For example, in certain exemplary embodiments, the accessory gearbox 66 may be coupled to the low speed spool 45 (e.g., the low speed shaft 46) through a suitable gear train and the electric machine 68 may be coupled to the accessory gearbox 66. However, in other exemplary embodiments, the electric machine 68 may be coupled to the low speed spool 45 of the turbomachine 30 independently of the accessory gearbox 66, and the accessory gearbox 66 may be coupled to either the low speed spool 45 or high speed spool 35.

Moreover, the exemplary turbomachine 30 depicted in FIG. 1 includes an inter-spool clutch 72. The inter-spool clutch 72 is positioned between the high and low speed spools 35, 45 to selectively couple the low speed spool 45 to the high speed spool 35 during certain operations, such as startup operations. Such may allow the electric machine 68 to be used to start, or assist with starting, the turbomachine 30.

It will be appreciated, however, that the exemplary single rotor unducted engine 10 depicted in FIG. 1 is by way of example only, and that in other exemplary embodiments, the engine 10 may have any other suitable configuration, including, for example, any other suitable number of shafts or spools, turbines, compressors, etc. Additionally, or alternatively, in other exemplary embodiments, any other suitable gas turbine engine may be provided. For example, in other exemplary embodiments, the gas turbine engine may be a ducted turbofan engine, a turboshaft engine, a turboprop engine, turbojet engine, etc.

Figure 2:
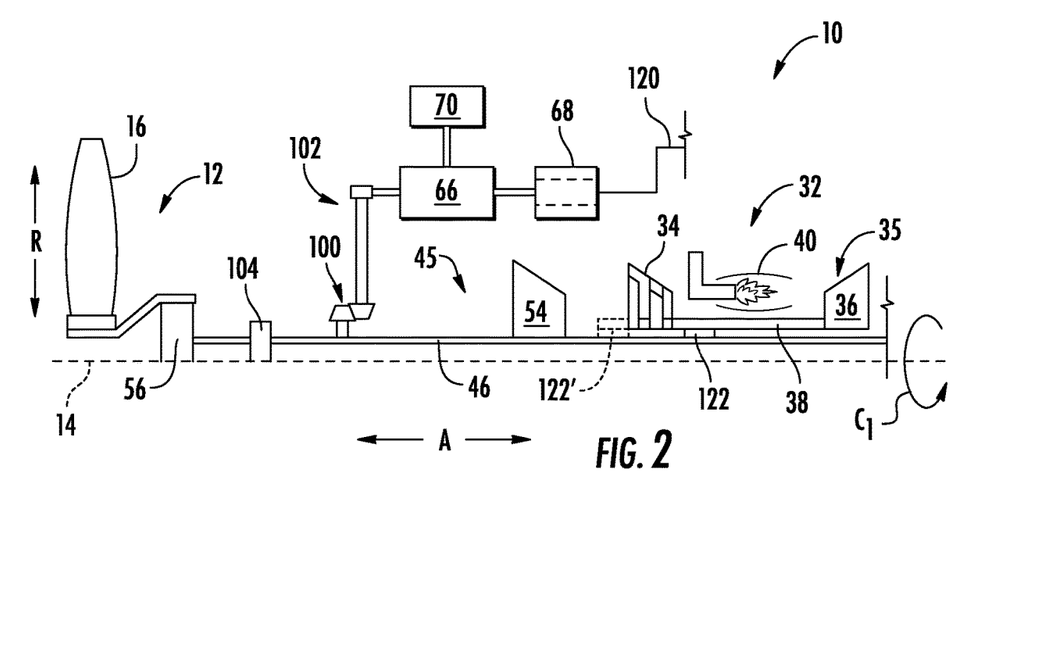
FIG. 2 is another schematic, cross-sectional view of a gas turbine engine in accordance with another exemplary aspect of the present disclosure.

Referring now to FIG. 2, a schematic view is depicted of a gas turbine engine 10 in accordance with an exemplary embodiment of the present disclosure. The exemplary gas turbine engine 10 of FIG. 2 may be configured in a similar manner as the exemplary engine 10 described above with respect to FIG. 1. Specifically, for the embodiment shown, the engine 10 includes an electric machine 68 mechanically coupled to a low speed spool 45 of a turbomachine 30 of the engine 10, and more specifically includes an accessory gearbox 66 mechanically coupled to a low speed spool 45 of the engine 10, with the electric machine 68 being coupled to the low speed spool 45 through the accessory gearbox 66. More specifically, still, the low speed spool 45 includes a low speed shaft 46 and forms at least in part a low speed compressor 54 and low speed turbine 42 (not shown). The accessory gearbox 66 is depicted coupled to the low speed shaft 46 of the low speed spool 45.

In such a manner, the accessory gearbox 66 may transfer rotational power from the low speed spool 45 of the engine 10 to, e.g., one or more accessory systems 70 of the engine 10 or aircraft incorporating the engine 10 that are mechanically coupled to the accessory gearbox 66 and the electric machine 68 (which is rotatable with the accessory gearbox 66). The engine 10 further includes a rotor assembly 12 and a power gearbox 56, with the rotor assembly 12 being driven by the low speed spool 45 across the power gearbox 56.

As will be appreciated, the various electrical and other accessory systems 70 of a gas turbine engine 10 are typically powered off an accessory gearbox driven by a core 32 of the engine 10, or more specifically, the high speed/high pressure system of the engine 10. With such a configuration, the engine core 32 is generally oversized to allow for operation of these accessory systems throughout the entire flight envelope. Notably, however, such a configuration may reduce a responsiveness of the engine 10 by virtue of the additional loads and inertia on the core 32 of the engine 10. It will be appreciated that by coupling the accessory gearbox 66 and electric machine 68 to the low speed spool 45 of the engine 10, as opposed to the high speed spool 35, the gas turbine engine 10 may have a more responsive core 32. Moreover, while such may in turn result in a less responsive low speed system and rotor assembly 12, inclusion of the electric machine 68 may make up the responsiveness, as discussed below.

Referring still to FIG. 2, it will be appreciated that the electric machine 68 is coupled to the low speed spool 45 of the turbomachine 30 at a connection point 100 of the low speed spool 45. More specifically, for the embodiment shown, the accessory gearbox 66 is coupled to the low speed spool 45 at the connection point 100, and the electric machine 68 is coupled to the low speed spool 45 through the accessory gearbox 66. Moreover, for the embodiment shown, the turbomachine 30 includes a gear train 102 coupled to the low speed spool 45 at the connection point 100 and extending to the accessory gearbox 66. In such a manner, the accessory gearbox 66 may transfer rotational power from the low speed spool 45 of the engine 10 to, e.g., one or more accessory systems 70 mechanically coupled to the accessory gearbox 66 and the electric machine 68 rotatable with the accessory gearbox 66.

Further, as is depicted in FIG. 2, the exemplary gas turbine engine 10 includes an engine clutch 104 positioned in a torque path of the low speed spool 45 at a location forward of the connection point 100 of the low speed spool 45 (where the accessory gearbox 66 is coupled to the low speed spool 45 through the gear train 102). Specifically, for the embodiment shown, the engine clutch 104 is positioned in the torque path of the low speed spool 45 between the connection point 100 and the rotor assembly 12.

The engine clutch 104 may be moved between an engaged position, wherein torque may be transmitted across the engine clutch 104 along the low speed spool 45 to drive the rotor assembly 12 (or vice versa), and a disengaged position, wherein torque may not be transmitted across the engine clutch 104 along the low speed spool 45 to the rotor assembly 12. In such a manner, the engine clutch 104 may facilitate operation of the engine 10 without rotating the rotor assembly 12. Such may be beneficial particularly during certain ground operations wherein it may be desirable to rotate the turbomachine 30 without creating thrust from the rotor assembly 12.

In at least certain exemplary aspects, the engine clutch 104 may be a two-stage clutch for transitioning from the disengaged position to the engaged position. For example, referring now to FIGS. 3 and 4, a sample exemplary embodiment of the engine clutch 104 in accordance with an exemplary embodiment of the present disclosure is depicted. For the embodiment shown, the engine clutch 104 includes a first portion 108 and a second portion 110 movable relative to one another along a longitudinal direction L. In certain exemplary embodiments, the longitudinal direction L may be aligned with the axial direction A of the engine 10. Further, in certain exemplary embodiments the first portion 108 may be rotatable with the rotor assembly 12 and the second portion 110 may be rotatable with the low speed spool 45 at the connection point 100 and aft of the connection point 100.

Figure 3:
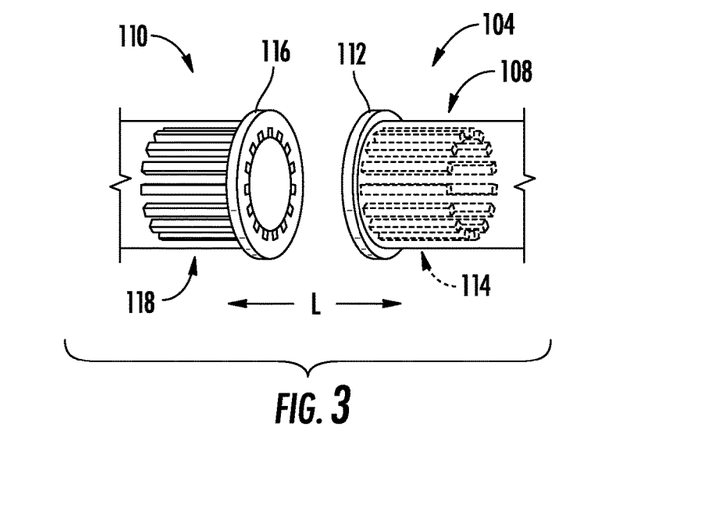
FIG. 3 is a schematic view of a clutch in accordance with an exemplary embodiment of the present disclosure in a first position.
Figure 4:
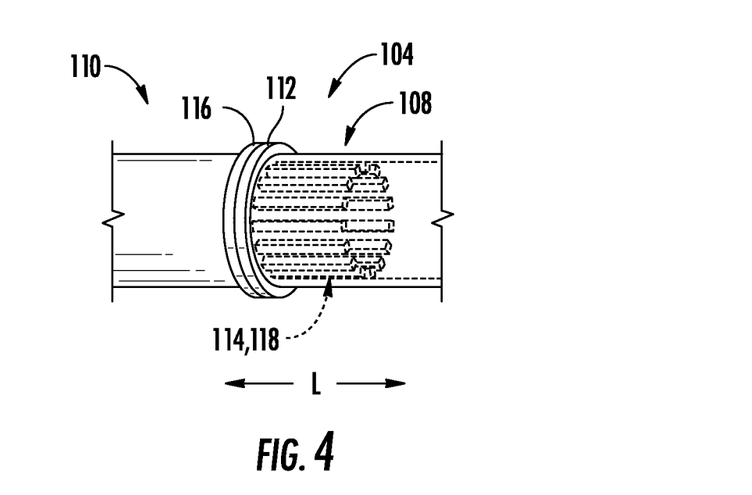
FIG. 4 is a schematic view of the exemplary clutch of FIG. 3 in a second position.

As shown in FIGS. 3 and 4, the first portion 108 of the engine clutch 104 includes a first friction plate 112 and a first set of geometric features 114 (depicted in phantom, positioned in an inner surface of the first portion 108). The second portion 110 of the engine clutch 104 includes a second friction plate 116 and a second set of geometric features 118, the second set of geometric features 118 correspondingly shaped to the first set of geometric features 114. More specifically, for the embodiment shown, the first set of geometric features 114 includes a plurality of protrusions extending along the longitudinal direction L and the second set of geometric features 118 includes a plurality of grooves extending along the longitudinal direction L. The plurality of protrusions are configured to be slidably received within the plurality of grooves. In such a manner, the first and second sets of geometric features 114, 118 may be referred to as a splined connection.

As will be appreciated, when the engine clutch 104 is in the disengaged position (FIG. 3) the low speed spool 45 may rotate freely relative to the rotor assembly 12. By contrast, when the engine clutch 104 is in the engaged position (FIG. 4), the low speed spool 45 rotates with the rotor assembly 12. The friction plates 112, 116 provide for a relatively smooth transition from the disengaged position to the engaged position.

Figure 5:
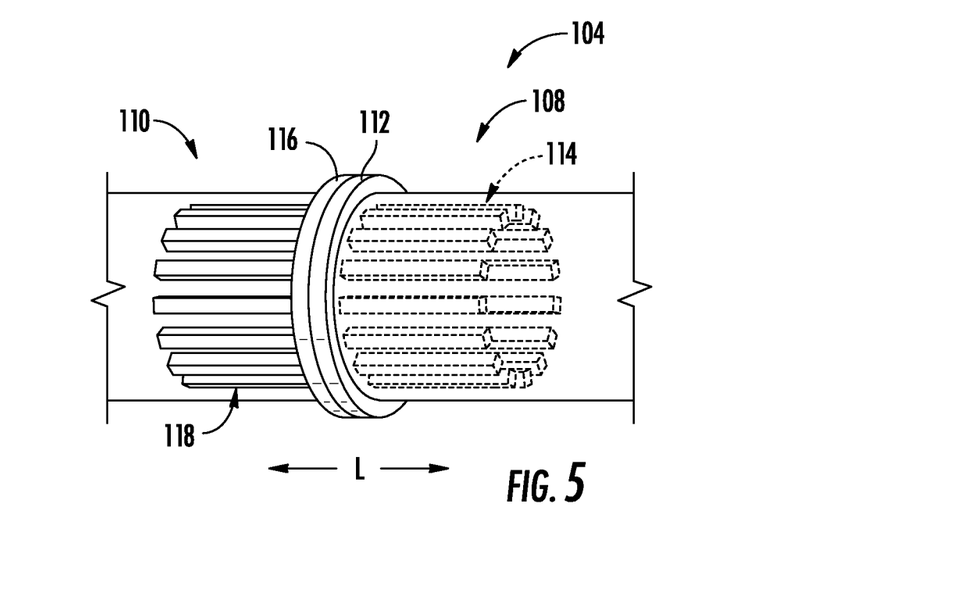
FIG. 5 is a schematic view of the exemplary clutch of FIG. 3 in a third position

More specifically, referring now also to FIG. 5, it will be appreciated that the clutch 104 is further moveable to a transition position. In the transition position, the first and second friction plates 112, 116 contact one another, but the first and second sets of geometric features 114, 118 do not. Such may allow for the rotor assembly 12 to slowly come up to speed before engaging the first and second geometric features 114, 118, locking the first and second portions 108, 110 of the clutch 104 together.

Notably, as will further be appreciated for the embodiment depicted, the second friction plate 116 is configured to slide along the longitudinal direction between the transition position and the engaged position. The second friction plate 116 may be biased along the longitudinal direction towards the first friction plate 112 by, e.g., one or more spring assemblies (not shown).

Further, the clutch 104 may be moved from the transition position to the engaged position along the longitudinal direction L after the rotor assembly 12 substantially matches a rotational speed of the low speed spool 45, such that the second geometric features 118 mesh with the first geometric features 114 to fix the first and second portions 108, 110 of the engine clutch 104 together.

It will further be appreciated such a configuration may allow for improved operations of the gas turbine engine 10. For example, such a configuration may allow for operation of the core 32 of the gas turbine engine 10 during, e.g., idle and post-landing operations, without engaging in rotating the rotor assembly 12. In such a manner, the electric machine 68 may be sized to accept 100% of a rated engine power, such that the gas turbine engine 10 may be operated at a rated engine power without engaging the rotor assembly 12 (i.e., by moving the engine clutch 104 to the disengaged position) and having the electric machine 68 convert substantially all of such power to electrical energy to be provided to the aircraft 248 incorporating the gas turbine engine 10 through an electric bus 120 (see FIG. 2), to one or more energy storage units within or in electrical communication with the bus 230, to assist with starting additional engines, a combination thereof, etc.

Subsequently, when it is desirable to produce thrust with the rotor assembly 12, the engine clutch 104 may be moved from a disengaged position to the transition position, slowly bringing the rotor assembly 12 up to speed before then moving the engine clutch 104 to the engaged position, rotationally locking the rotor assembly 12 to the low speed spool 45

It will further be appreciated that with the above configuration, the electric machine 68 may be utilized to accelerate the rotor assembly 12 more quickly during preflight operations once the engine clutch 104 is moved to the engaged position. More specifically, electrical power may be provided to the electric machine 68 and converted to rotational power provided through the accessory gearbox 66 to the low speed spool 45 to directly assist with accelerating the rotor assembly 12. Such may ensure the low speed spool 45 has a desired responsiveness despite the mounting of the accessory gearbox 66 to the low speed spool 45.

As will also be appreciated, in such a manner the electric machine 68 may further be used to start, or assist with starting, the engine 10. Referring back to FIG. 2, it will be appreciated that the exemplary engine 10 depicted further includes an inter-spool clutch 122 positioned between the low speed/low pressure system of the gas turbine engine 10 and the high speed/high pressure system of the gas turbine engine 10. Particularly for the embodiment shown, the inter-spool clutch 122 is positioned between the low speed spool 45 and the high speed spool 35. More specifically, for the embodiment shown, the inter-spool clutch 122 is positioned between the low speed spool 45 and the high speed spool 35 at a location aligned with or positioned forward of the combustion section 40 along the axial direction A of the gas turbine engine 10, and aligned with or aft of the high speed compressor 34 along the axial direction A. Such a configuration may allow for a balanced torque on the inter-spool clutch 122 when the inter-spool clutch 122 couples the low speed spool 45 to the high speed spool 35.

It will be appreciated, however, that in other embodiments, the inter-spool clutch 122 may be positioned at any other suitable location. For example, in other exemplary embodiments, as is depicted in phantom in FIG. 2 as element 122', the inter-spool clutch 122 may be positioned at any suitable location forward of the combustion section 40, such as aligned with or positioned forward of the high speed compressor 34 along the axial direction A, such as positioned forward of the high speed compressor 34 along the axial direction A. Such a configuration may provide for a cooler inter-spool clutch 122 by virtue of its spacing from the combustion section 40, reducing a likelihood that the inter-spool clutch 122 prematurely wears.

During operation, the inter-spool clutch 122 may ensure that the low speed/low pressure system (low speed spool 45) does not rotate faster than the high speed/high pressure system (high speed spool 35) in a first circumferential direction C1 (i.e., the circumferential direction the high and low speed spools 35, 45 are configured to rotate during normal flight operations; see also FIG. 6, discussed below). The inter-spool clutch 122 may be a one-way clutch configured to passively engage and disengage depending on one or more operating conditions, such as a relative rotational speed and torque on the high and low speed spools 35, 45. For example, in certain exemplary embodiments the electric machine 68 may be operable as the starter motor for the gas turbine engine 10. In such an exemplary embodiment, during starting operations the electric machine 68 may receive electrical power through an electric power bus 120, and convert such power to mechanical power that is transmitted through the accessory gearbox 66 and gear train 102 to the low speed spool 45, rotating the low speed spool 45 in the first circumferential direction C1. The inter-spool clutch 122 may be engaged by such rotation, such that the low speed spool 45 correspondingly rotates the high speed spool 35 in the first circumferential direction C1 across the inter-spool clutch 122. Such operation may continue until the gas turbine engine 10 has reached a light-off point. As used wherein, the term "light-off point) refers to a rotation speed wherein the high and/or low speed spools 45, 35 sufficient to provide an amount of airflow to the combustion section 40 to enable ignition of the combustion section 40 and sustained combustion. At this point, the combustion section 40 may generate combustion gasses to drive the high speed spool 35, and the high speed spool 35 may have additional forces (from combustion gasses) urging the high speed spool 35 to rotate more quickly in the first circumferential direction C1 than the low speed spool 45. The inter-spool clutch 122 may be passively/automatically disengaged at this point, allowing for the high speed spool 35 to rotate more quickly in the first circumferential direction C1 than the low speed spool 45.

As noted, the inter-spool clutch 122 may be configured as a one-way clutch. For example, referring now to FIG. 6, it will be appreciated that in at least certain exemplary aspects, the inter-spool clutch 122 may be configured as a sprag clutch. FIG. 6 provides a schematic, axial view (i.e., view along the axial direction A) of the exemplary inter-spool clutch 122. The exemplary sprag clutch depicted includes a plurality of sprags 124 positioned between an inner race 126 and an outer race 128. The inner race 126 is fixed to, or formed integrally with, the low speed spool 45 and the outer race 128 is coupled to the high speed spool 35. When the inner race 126 rotates counterclockwise relative to the outer race 128 (at least for view of the embodiment depicted), or when the outer race 128 rotates more quickly than the inner race 126, the plurality of sprags 124 provide substantially no resistance to such movement. By contrast, when the inner race 126 attempts to rotate clockwise relative to the outer race 128 (the first circumferential direction C1), the plurality of sprags 124 rotate about each of their respective axes of rotation 125 and lock the inner race 126 to the outer race 128, such that no relative rotation of the inner race 126 to the outer race 128 in the clockwise direction is allowed.

Figure 6:
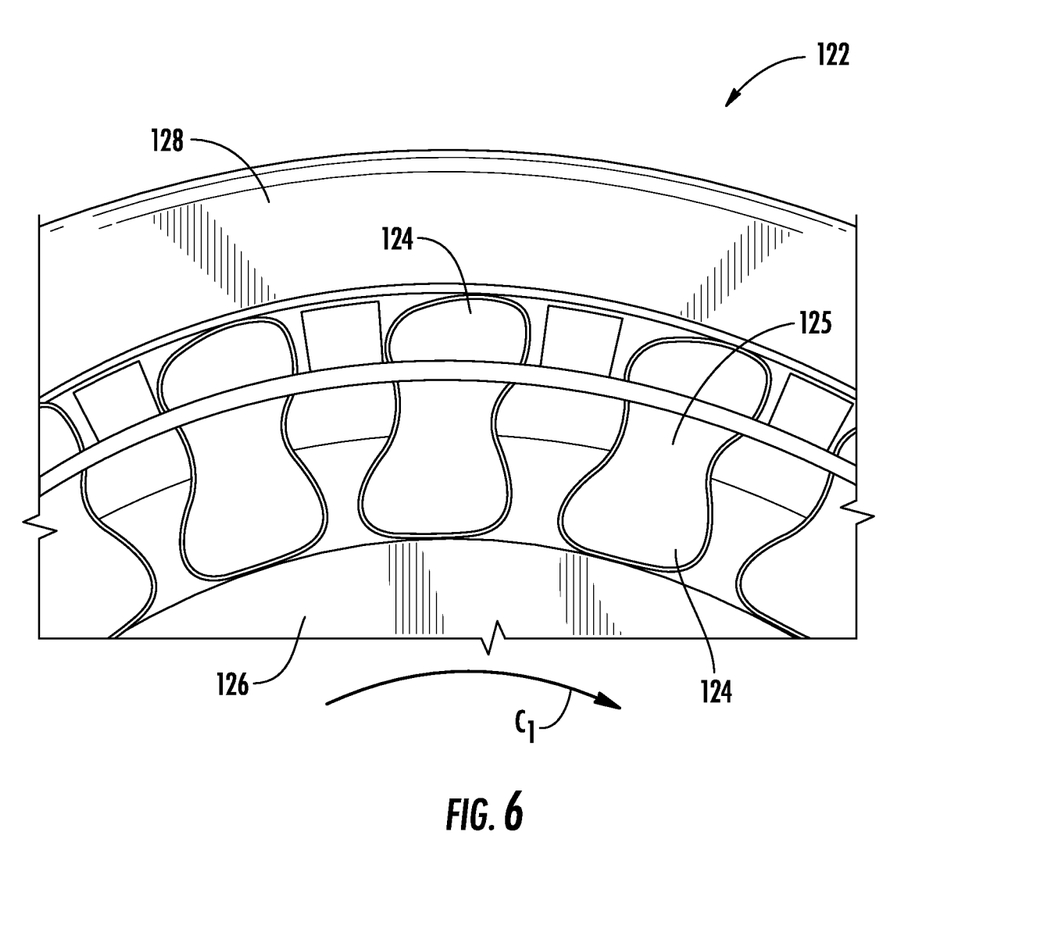
FIG. 6 is a view of an inter-spool clutch along an axial direction in accordance with an exemplary embodiment of the present disclosure.

More specifically, it will be appreciated that for the exemplary view depicted in FIG. 6, the clockwise direction is the first circumferential direction C1. In such a manner, it will be appreciated that the low speed spool 45 and the high speed spool 35 are configured to rotate in the first circumferential direction C1 during operation of the gas turbine engine 10. It will further be appreciated that with such a configuration, the inter-spool clutch 122 is configured to passively engage and couple the low speed spool 45 (inner race 126) to the high speed spool 35 (outer race 128) to prevent a rotational speed of the low speed spool 45 (inner race 126) from exceeding a rotational speed of the high speed spool 35 (outer race 128) in the first circumferential direction C1. In such a manner, the low speed spool 45 may be coupled to the high speed spool 35 during startup operations such that the electric machine 68 may initiate a rotation of the high speed spool 35 despite being coupled to the low speed spool 45.

Moreover, it will be appreciated that with such a configuration the inter-spool clutch 122 is configured to passively disengage and decoupled the low speed spool 45 (inner race 126) from the high speed spool 35 (outer race 128) to allow a rotational speed of the high speed spool 35 (outer race 128) to exceed a rotational speed of the low speed spool 45 (inner race 126) in the first circumferential direction C1. In such a manner, the inter-spool clutch 122 may allow the high speed spool 35 to rotate more quickly than the low speed spool 45 once the engine is started without having to actively actuate the inter-spool clutch 122.

It should be appreciated, however, that in other embodiments, any other suitable inter-spool clutch 122 may be utilized. For example, in other exemplary embodiments, the inter-spool clutch 122 may be an actively actuated, two step clutch (similar to the engine clutch discussed above), may be any other suitable form of one-way clutch, etc.

In such a manner, the electric machine 68 may assist with starting the engine 10 by directly rotating the high speed spool 35, despite being coupled to the low speed spool 45.

It will be appreciated, however, that in other exemplary embodiments the engine may have any other suitable configuration. For example, although for the embodiments depicted in the figures, the electric machine 68 is spaced from the low speed spool 45, it will be appreciated that in other exemplary embodiments, the electric machine 68 may instead be mounted around the low speed spool 45, sharing an axis of rotation with the low speed spool 45. With such a configuration, a rotor of electric machine 68 may be mounted around a low speed shaft of the low speed spool 45. Still other configurations are contemplated as well.

Figure 7:
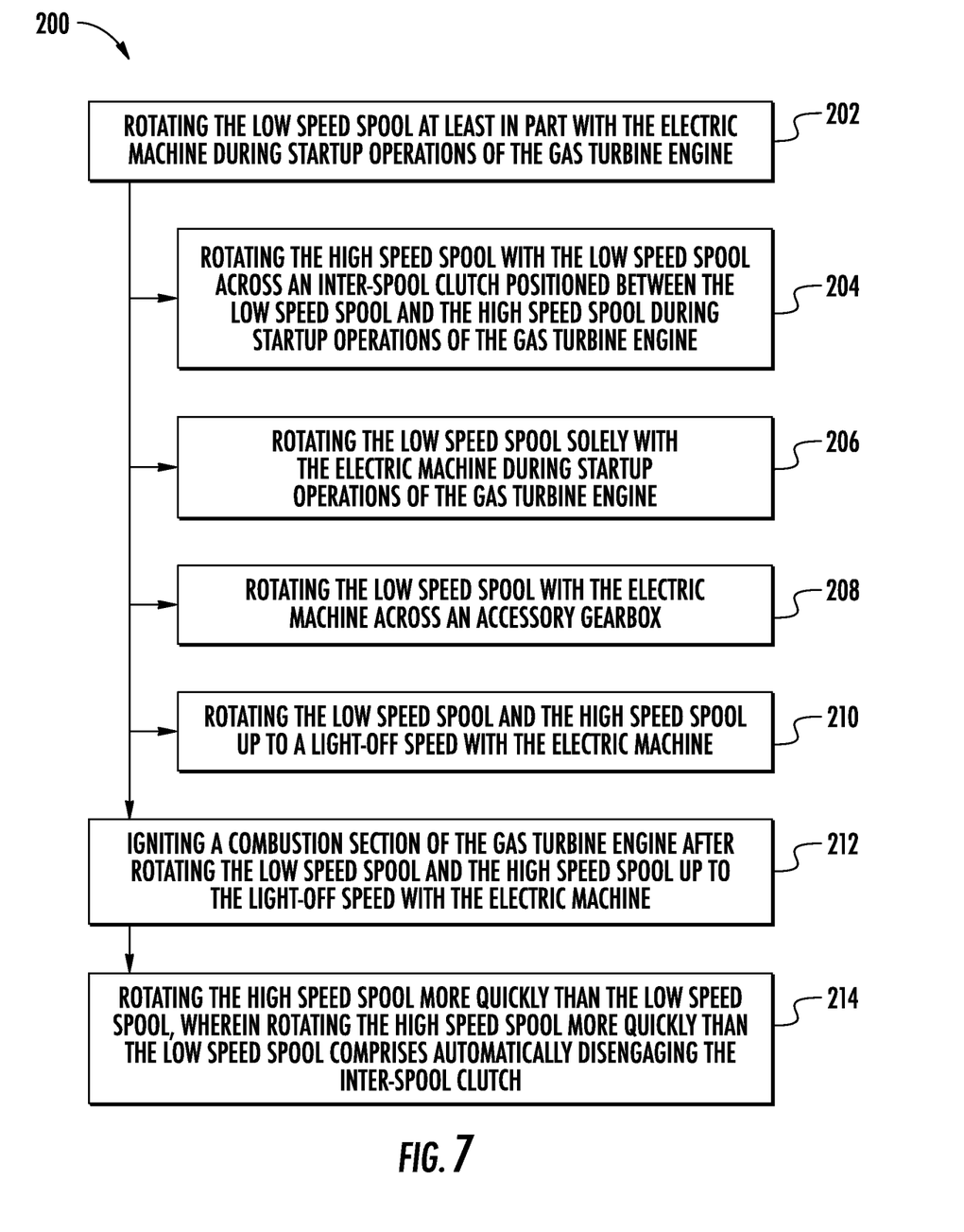
FIG. 7 is a flow diagram of a method of operating a propulsion system in accordance with an exemplary aspect of the present disclosure.

Referring now to FIG. 7, a flow diagram of a method 200 of operating a gas turbine engine is provided. The method 200 may be used to operate a gas turbine engine configured in a similar manner as one or more of the gas turbine engines described above. Accordingly, the gas turbine engine may includes a low speed spool, a high speed spool, and an electric machine coupled to the low speed spool.

For the exemplary aspect of FIG. 7, the method 200 includes at (202) rotating the low speed spool at least in part with the electric machine during startup operations of the gas turbine engine. More specifically, for the exemplary aspect of FIG. 7, rotating the low speed spool at least in part with the electric machine during startup operations of the gas turbine engine at (202) includes at (204) rotating the high speed spool with the low speed spool across an inter-spool clutch positioned between the low speed spool and the high speed spool during startup operations of the gas turbine engine. As discussed above, the inter-spool clutch may be a one-way clutch.

Further, for the exemplary aspect of FIG. 7, rotating the low speed spool at least in part with the electric machine during startup operations of the gas turbine engine at (202) more specifically includes at (206) rotating the low speed spool solely with the electric machine during startup operations of the gas turbine engine, at (208) rotating the low speed spool with the electric machine across an accessory gearbox, and at (210) rotating the low speed spool and the high speed spool up to a light-off speed with the electric machine.

Moreover, the exemplary method 200 depicted further includes at (212) igniting a combustion section of the gas turbine engine after rotating the low speed spool and the high speed spool up to the light-off speed with the electric machine, and at (214) rotating the high speed spool more quickly than the low speed spool, wherein rotating the high speed spool more quickly than the low speed spool comprises automatically disengaging the inter-spool clutch.

Further aspects of the invention are provided by the subject matter of the following clauses:

A gas turbine engine comprising: a turbomachine comprising a low speed spool and a high speed spool; a rotor assembly coupled to the low speed spool; an electric machine rotatable with the low speed spool for extracting power from the low speed spool, for adding power to the low speed spool, or both; and an inter-spool clutch positioned between the low speed spool and the high speed spool for selectively coupling the low speed spool to the high speed spool.

The gas turbine engine of one of more of these clauses, wherein the inter-spool clutch is a one-way clutch.

The gas turbine engine of one of more of these clauses, wherein the inter-spool clutch is a sprag clutch.

The gas turbine engine of one of more of these clauses, wherein the low speed spool and the high speed spool are configured to rotate in a first circumferential direction during operation of the gas turbine engine, wherein the inter-spool clutch is configured to passively disengage and decoupled the low speed spool from the high speed spool to allow a rotational speed of the high speed spool to exceed a rotational speed of the low speed spool in the first circumferential direction.

The gas turbine engine of one of more of these clauses, wherein the low speed spool and the high speed spool are configured to rotate in a first circumferential direction during operation of the gas turbine engine, wherein the inter-spool clutch is configured to passively engage and couple the low speed spool to the high speed spool to prevent a rotational speed of the low speed spool from exceeding a rotational speed of the high speed spool in the first circumferential direction.

The gas turbine engine of one of more of these clauses, wherein the turbomachine further comprises a combustion section, and wherein the inter-spool clutch is aligned with or positioned forward of the combustion section along an axial direction of the gas turbine engine.

The gas turbine engine of one of more of these clauses, wherein the high speed spool comprises at least in part a high speed compressor, and wherein the inter-spool clutch is aligned with or positioned forward of the high speed compressor along an axial direction of the gas turbine engine.

The gas turbine engine of one of more of these clauses, wherein the electric machine is configured to rotate the high speed spool up to a light-off speed through the inter-spool clutch and the low speed spool during startup operations of the gas turbine engine.

The gas turbine engine of one of more of these clauses, further comprising: an accessory gearbox coupled to the low speed spool, and wherein the electric machine is coupled to the low speed spool through the accessory gearbox.

The gas turbine engine of one of more of these clauses, wherein the gas turbine engine is configured as a single unducted rotor engine, and wherein the rotor assembly comprises a single stage of unducted rotor blades.

The gas turbine engine of one of more of these clauses, further comprising: a stage of unducted guide vanes positioned downstream of the single stage of unducted rotor blades.

A method of operating a gas turbine engine comprising a low speed spool, a high speed spool, and an electric machine coupled to the low speed spool, the method comprising: rotating the low speed spool at least in part with the electric machine during startup operations of the gas turbine engine; wherein rotating the low speed spool at least in part with the electric machine during startup operations of the gas turbine engine comprises rotating the high speed spool with the low speed spool across an inter-spool clutch positioned between the low speed spool and the high speed spool during startup operations of the gas turbine engine.

The method of one or more of these clauses, wherein rotating the low speed spool at least in part with the electric machine during startup operations of the gas turbine engine further comprises rotating the low speed spool and the high speed spool up to a light-off speed with the electric machine.

The method of one or more of these clauses, further comprising: igniting a combustion section of the gas turbine engine after rotating the low speed spool and the high speed spool up to the light-off speed with the electric machine.

The method of one or more of these clauses, further comprising: rotating the high speed spool more quickly than the low speed spool, wherein rotating the high speed spool more quickly than the low speed spool comprises automatically disengaging the inter-spool clutch.

The method of one or more of these clauses, wherein the inter-spool clutch is a one-way clutch.

The method of one or more of these clauses, wherein the turbomachine further comprises a combustion section, and wherein the inter-spool clutch is aligned with or positioned forward of the combustion section along an axial direction of the gas turbine engine.

The method of one or more of these clauses, wherein rotating the low speed spool at least in part with the electric machine during startup operations of the gas turbine engine comprises rotating the low speed spool solely with the electric machine during startup operations of the gas turbine engine.

The method of one or more of these clauses, wherein rotating the low speed spool at least in part with the electric machine during startup operations of the gas turbine engine comprises rotating the low speed spool with the electric machine across an accessory gearbox.

The method of one or more of these clauses, wherein the gas turbine engine is configured as a single unducted rotor engine, and wherein the rotor assembly comprises a single stage of unducted rotor blades.

What is claimed is:

1. A gas turbine engine defining an axial direction, the gas turbine engine comprising:
a turbomachine comprising a combustion section, a low speed spool and a high speed spool;

a rotor assembly coupled to the low speed spool;
an electric machine rotatable with the low speed spool for extracting power from the low speed spool, for adding power to the low speed spool, or both; and
an inter-spool clutch positioned between the low speed spool and the high speed spool for selectively coupling the low speed spool to the high speed spool,
wherein the high speed spool comprises at least in part a high speed compressor, and
wherein at least a portion of the inter-spool clutch is positioned at a location aligned with or forward of the combustion section along the axial direction and aligned with or positioned aft of the high speed compressor along the axial direction.

2. The gas turbine engine of claim 1, wherein the inter-spool clutch is a one-way clutch.

3. The gas turbine engine of claim 1, wherein the inter-spool clutch is a sprag clutch.

4. The gas turbine engine of claim 1,
wherein the low speed spool and the high speed spool are configured to rotate in a first circumferential direction during operation of the gas turbine engine,
wherein the inter-spool clutch is configured to passively disengage and decoupled the low speed spool from the high speed spool to allow a rotational speed of the high speed spool to exceed a rotational speed of the low speed spool in the first circumferential direction.

5. The gas turbine engine of claim 1,
wherein the low speed spool and the high speed spool are configured to rotate in a first circumferential direction during operation of the gas turbine engine,
wherein the inter-spool clutch is configured to passively engage and couple the low speed spool to the high speed spool to prevent a rotational speed of the low speed spool from exceeding a rotational speed of the high speed spool in the first circumferential direction.

6. The gas turbine engine of claim 1, wherein the electric machine is configured to rotate the high speed spool up to a light-off speed through the inter-spool clutch and the low speed spool during startup operations of the gas turbine engine.

7. The gas turbine engine of claim 1, further comprising:
an accessory gearbox coupled to the low speed spool, and
wherein the electric machine is coupled to the low speed spool through the accessory gearbox.

8. The gas turbine engine of claim 1,
wherein the gas turbine engine is configured as a single unducted rotor engine, and
wherein the rotor assembly comprises a single stage of unducted rotor blades.

9. The gas turbine engine of claim 8, further comprising:
a stage of unducted guide vanes positioned downstream of the single stage of unducted rotor blades.

10. A method of operating a gas turbine engine defining an axial direction and comprising a combustion section, a low speed spool, a high speed spool, and an electric machine coupled to the low speed spool, the method comprising:
rotating the low speed spool at least in part with the electric machine during startup operations of the gas turbine engine;
wherein rotating the low speed spool at least in part with the electric machine during startup operations of the gas turbine engine comprises rotating the high speed spool with the low speed spool across an inter-spool clutch positioned between the low speed spool and the high speed spool during startup operations of the gas turbine engine,
wherein the high speed spool comprises at least in part a high speed compressor, and
wherein at least a portion of the inter-spool clutch is positioned at a location aligned with or forward of the combustion section along the axial direction and aligned with or positioned aft of the high speed compressor along the axial direction.

11. The method of claim 10, wherein rotating the low speed spool at least in part with the electric machine during startup operations of the gas turbine engine further comprises rotating the low speed spool and the high speed spool up to a light-off speed with the electric machine.

12. The method of claim 11, further comprising:
igniting a combustion section of the gas turbine engine after rotating the low speed spool and the high speed spool up to the light-off speed with the electric machine.

13. The method of claim 12, further comprising:
rotating the high speed spool more quickly than the low speed spool,
wherein rotating the high speed spool more quickly than the low speed spool comprises automatically disengaging the inter-spool clutch.

14. The method of claim 10, wherein the inter-spool clutch is a one-way clutch.

15. The method of claim 10, wherein rotating the low speed spool at least in part with the electric machine during startup operations of the gas turbine engine comprises rotating the low speed spool solely with the electric machine during startup operations of the gas turbine engine.

16. The method of claim 10, wherein rotating the low speed spool at least in part with the electric machine during startup operations of the gas turbine engine comprises rotating the low speed spool with the electric machine across an accessory gearbox.

17. The method of claim 10,
wherein the gas turbine engine is configured as a single unducted rotor engine, and
wherein the rotor assembly comprises a single stage of unducted rotor blades.

* * * * *